US008670295B1

(12) United States Patent
Hu et al.

(10) Patent No.: US 8,670,295 B1
(45) Date of Patent: Mar. 11, 2014

(54) METHOD AND SYSTEM FOR OPTICALLY COUPLING A LASER WITH A TRANSDUCER IN AN ENERGY ASSISTED MAGNETIC RECORDING DISK DRIVE

(75) Inventors: Yufeng Hu, Fremont, CA (US); Ruolin Li, Milpitas, CA (US); Ut Tran, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 117 days.

(21) Appl. No.: 12/973,328

(22) Filed: Dec. 20, 2010

(51) Int. Cl.
*G11B 11/00* (2006.01)

(52) U.S. Cl.
USPC ..................... 369/13.33; 369/13.13

(58) Field of Classification Search
USPC ........ 369/13.33, 13.13, 13.32, 13.02, 112.09,
369/112.14, 112.21, 112.27, 300; 360/59;
385/129, 31, 88–94;
29/603.07–603.27; 250/201.3, 201.5
See application file for complete search history.

(56) References Cited

U.S. PATENT DOCUMENTS

| | | | |
|---|---|---|---|
| 7,034,277 B2 | 4/2006 | Oumi et al. | |
| 7,480,214 B2 | 1/2009 | Challener | |
| 7,642,205 B2 | 1/2010 | Timans | |
| 7,710,686 B2 | 5/2010 | Kim | |
| 7,724,470 B2 | 5/2010 | Poon | |
| 8,085,459 B1 | 12/2011 | Russell et al. | |
| 8,111,443 B1 | 2/2012 | Russell et al. | |
| 8,200,054 B1 | 6/2012 | Li et al. | |
| 8,302,480 B2 | 11/2012 | Maris et al. | |
| 8,325,566 B2 * | 12/2012 | Shimazawa et al. | 369/13.33 |
| 8,339,905 B2 | 12/2012 | Rausch et al. | |
| 2002/0044285 A1 | 4/2002 | Pedersen et al. | |
| 2005/0122850 A1 * | 6/2005 | Challener et al. | 369/13.33 |
| 2006/0233061 A1 | 10/2006 | Rausch | |
| 2007/0116420 A1 | 5/2007 | Estes et al. | |
| 2007/0165495 A1 | 7/2007 | Lee et al. | |
| 2008/0158730 A1 | 7/2008 | Furukawa | |
| 2008/0204916 A1 * | 8/2008 | Matsumoto et al. | 369/13.33 |
| 2009/0165285 A1 * | 7/2009 | Takayama et al. | 29/603.09 |
| 2009/0185459 A1 * | 7/2009 | Matsumoto | 369/13.02 |
| 2010/0123900 A1 | 5/2010 | Chau et al. | |
| 2010/0214685 A1 * | 8/2010 | Seigler et al. | 369/13.33 |
| 2010/0315735 A1 * | 12/2010 | Zhou et al. | 369/13.33 |
| 2010/0316327 A1 | 12/2010 | Montoya et al. | |

(Continued)

OTHER PUBLICATIONS

Ikkawi, R.; Amos, N.; Lavrenov, A.; Krichevsky, A.; Teweldebrhan, D.; Ghosh, S.; Balandin, A.A.; Litvinov, D.; & Khizroev; Near-Field Optical Transducer for Heat-Assisted Magnetic Recording for Beyond-10-Tbit/in2 Densities, Journal of Nanoelectronics and Optoelectronis, vol. 3, 44-54, 2008.

(Continued)

*Primary Examiner* — Tan X Dinh

(57) ABSTRACT

A method and system for providing an energy assisted magnetic recording (EAMR) transducer coupled with a laser. The EAMR transducer has an air-bearing surface (ABS) configured to reside in proximity to a media during use. The EAMR transducer includes a write pole, at least one coil, a waveguide and an output device. The write pole is configured to write to a region of the media. The at least one coil is for energizing the write pole. The waveguide has an input optically coupled to the laser and configured to direct energy from the laser toward the ABS for heating the region of the media. The output device is optically coupled to the waveguide. The output device coupling out a portion of the energy not coupled to the media.

12 Claims, 4 Drawing Sheets

(56) References Cited

U.S. PATENT DOCUMENTS

| | | | |
|---|---|---|---|
| 2011/0122737 A1* | 5/2011 | Shimazawa et al. | 369/13.33 |
| 2011/0216635 A1* | 9/2011 | Matsumoto | 369/13.33 |
| 2012/0092971 A1* | 4/2012 | Schreck et al. | 369/13.33 |
| 2012/0155232 A1* | 6/2012 | Schreck et al. | 369/13.33 |
| 2012/0163137 A1* | 6/2012 | Wang et al. | 369/13.33 |

OTHER PUBLICATIONS

Chubing Peng, "Surface-plasmon resonance of a planar lollipop near-field transducer", Applied Physics Letters 94, 171106-1, Apr. 2009, 4 pages.

* cited by examiner

METHOD AND SYSTEM FOR OPTICALLY COUPLING A LASER WITH A TRANSDUCER IN AN ENERGY ASSISTED MAGNETIC RECORDING DISK DRIVE

BACKGROUND

FIG. 1 depicts a side view of portion of a conventional energy assisted magnetic recording (EAMR) disk drive 10. The conventional EAMR disk drive 10 includes a recording media 12, a conventional EAMR head 20, and a conventional laser diode 30 that are typically attached to a suspension (not shown). The EAMR head 20 includes a slider 22 and EAMR transducer 24. Other components that may be part of the conventional EAMR disk drive 10 are not shown. The conventional slider 22 is typically attached to a suspension (not shown). A conventional EAMR transducer 24 is coupled with the slider 22 on the trailing face of the slider 22.

The conventional EAMR transducer 24 includes a grating (not separately shown) that receives light from the laser diode. The light from the laser diode 30 is coupled into the grating and then provided to a waveguide (not shown) of the conventional transducer 24. The waveguide directs the light toward the conventional media 12. The light is typically coupled to a near-field transducer (NFT) that is not shown in FIG. 1. The NFT couples the light to small region of the conventional media 12, which is heated. The conventional EAMR transducer 24 magnetically writes to the conventional media 12 in the region the conventional media 12 is heated.

Although the conventional EAMR disk drive 10 may function, manufacturing the conventional EAMR disk drive 10 at an acceptable cost and with sufficient optical efficiency may be problematic. More specifically, integration of the laser 30 with the slider 22 in a manner that allows for efficient light delivery may be challenging. Both wafer level waveguide process control and laser diode attachment accuracy affect alignment of the laser 30 with the relevant portions of the EAMR head 20. Misalignments adversely affect the coupling of optical energy from the laser to the EAMR transducer 24 and thus to the media 12. The optical efficiency of the EAMR head 20 and, therefore, head performance may be adversely affected. In addition, laser diode performance typically changes with environment and time. Consequently, driving the laser 30 at a set power based on its initial output eventually results in the laser 30 producing insufficient energy. Again, performance of the EAMR head 10 may be adversely affected.

Accordingly, what is needed is a system and method for improving manufacturability and performance of an EAMR disk drive.

BRIEF SUMMARY OF THE INVENTION

A method and system for providing an energy assisted magnetic recording (EAMR) transducer coupled with a laser. The EAMR transducer has an air-bearing surface (ABS) configured to reside in proximity to a media during use. The EAMR transducer includes a write pole, at least one coil, a waveguide and an output device. The write pole is configured to write to a region of the media. The at least one coil is for energizing the write pole. The waveguide has an input optically coupled to the laser and configured to direct energy from the laser toward the ABS for heating the region of the media. The output device is optically coupled to the waveguide. The output device coupling out a portion of the energy not coupled to the media.

DETAILED DESCRIPTION OF THE EMBODIMENTS OF THE INVENTION

Figure 1:
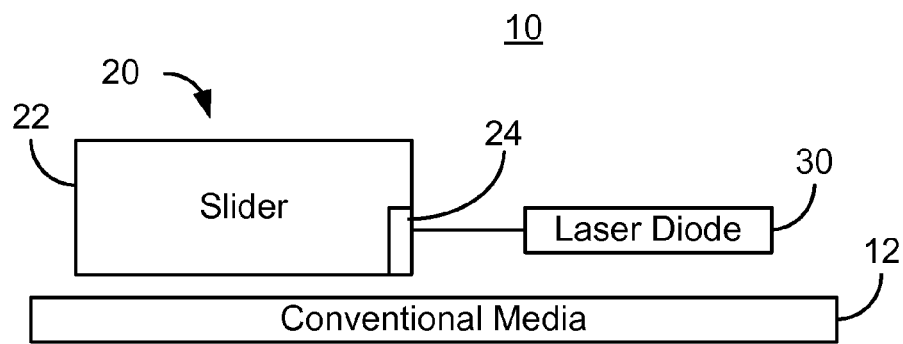
FIG. 1 depicts a side view of a conventional EAMR disk drive.
Figure 2:
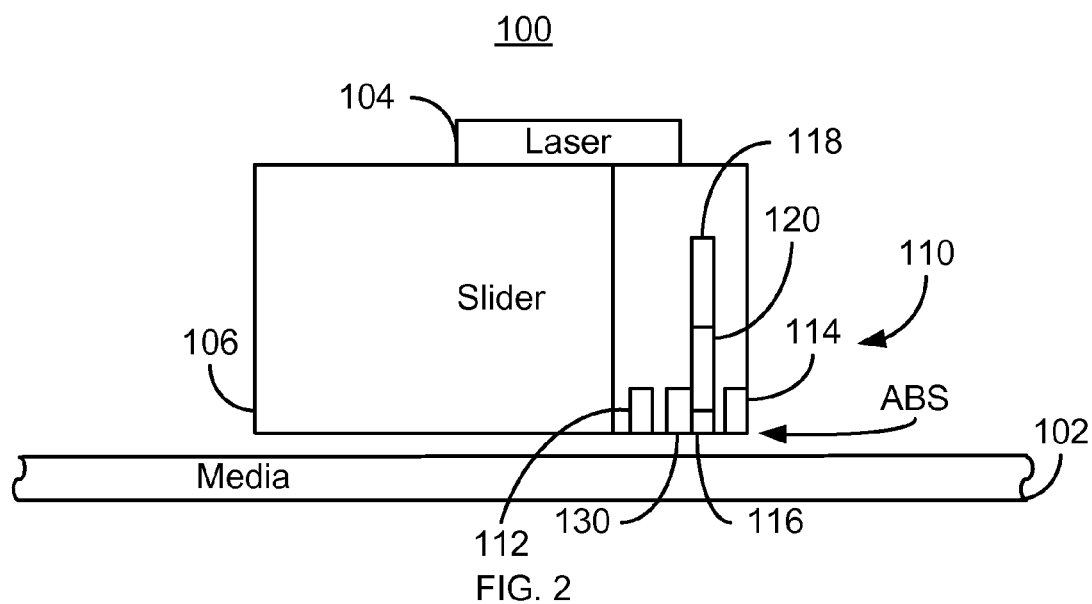
FIG. 2 depicts an exemplary embodiment of a portion of an EAMR disk drive.

FIG. 2 is a diagram depicting a portion of an EAMR disk drive 100. For clarity, FIG. 2 is not to scale. For simplicity not all portions of the EAMR disk drive 100 are shown. In addition, although the disk drive 100 is depicted in the context of particular components other and/or different components may be used. In addition, although single components, such as lasers, are shown, multiple components may be used in other embodiments. Further, the arrangement of components may vary in different embodiments.

The EAMR disk drive 100 includes media 102, laser 104, a slider 106, and an EAMR transducer 110 that is optically coupled with the laser 104. In some embodiments, the laser 104 is a laser diode. Although shown as coupled with the back edge of the slider 106, the laser may be located elsewhere. For example, the laser 104 may be coupled to the trailing face of the slider 106, in proximity to the EAMR transducer 110.

The EAMR transducer 110 is coupled with the slider 106. The EAMR transducer 110 includes a pole 112, coil(s) 114, optional near-field transducer (NFT) 116, input coupler 118, waveguide 120, and output device 130. In one embodiment, the EAMR transducer 110 is optically coupled to the laser 120 through the input coupler 118, which may be a grating. The waveguide 120 has an input optically coupled to the laser (i.e. via the input coupler/grating 118). The waveguide 120 is configured to direct energy from the laser 104 toward the ABS for heating the region of the media 102. The NFT 116 is proximate to the ABS and optically coupled to the waveguide 120. Thus, in embodiments in which the NFT 116 is present, the waveguide 120 directs energy toward the NFT 116. The NFT 116 may be used to couple energy from the waveguide 118 to the media 102. The output device 130 is optically coupled to the waveguide 120 and is used to couple out a portion of the energy not coupled to the media 102. In some embodiments, the output device 130 couples out the portion of the energy not coupled to the NFT 116. The output device 130 may be an output grating, an end of the waveguide 120 or other device from which energy propagated by the waveguide 120 may be coupled out of the transducer 110. Although described as coupled to the slider 106, the EAMR transducer 110 may be considered to be fabricated as part of the slider 106.

As discussed above, the components of the EAMR disk drive 100 may also be arranged differently. In some embodiments, the NFT 116 is between the input of the waveguide 120 and the end of the waveguide 120. In other embodiments, the waveguide 120 may terminate at the NFT 118 or ABS. The waveguide 120 may also include one or more bending regions that might have various radii of curvature. In some embodiments, the EAMR transducer 110 may also include an output coupler that is coupled with a portion of the waveguide 120 and the output device 130. In such embodiments, the output coupler couples at least the portion of the energy to the output device 130.

In operation, energy, typically in the form of light in the optical range of the spectrum, is emitted from the laser 104. The energy is coupled into the transducer 110 via input coupler/grating 118. The waveguide 120 directs the energy toward the NFT 116. The NFT 116 couples energy to the media 102. The coils 114 energize the pole 112, which magnetically writes to the heated region of the media.

The output device 130 allows the laser power to be monitored, for example during operation or fabrication. Some portion of the light emitted by the laser 104 is coupled into the output device 130. Thus, the output of the laser 104 may be monitored, for example using a photodetector (not shown) optically coupled with the output device 130. In some embodiments, power is monitored during operation of the EAMR disk drive 100. Based on the power output at the output device 130, the input power to the laser 104 may be adjusted. Thus, the laser 104 may be controlled during operation. In addition, the output device may be used in actively aligning the laser 104 and slider 106. In particular, the laser 104 may be energized during alignment. The output power of the output device 130 may be monitored during alignment, for example using a photodetector. If the output power meets or exceeds a threshold, the laser 104 may be considered to be sufficiently aligned with the slider 106. Thus, performance and manufacturing of the EAMR disk drive 100 may be enhanced.

Figure 3:
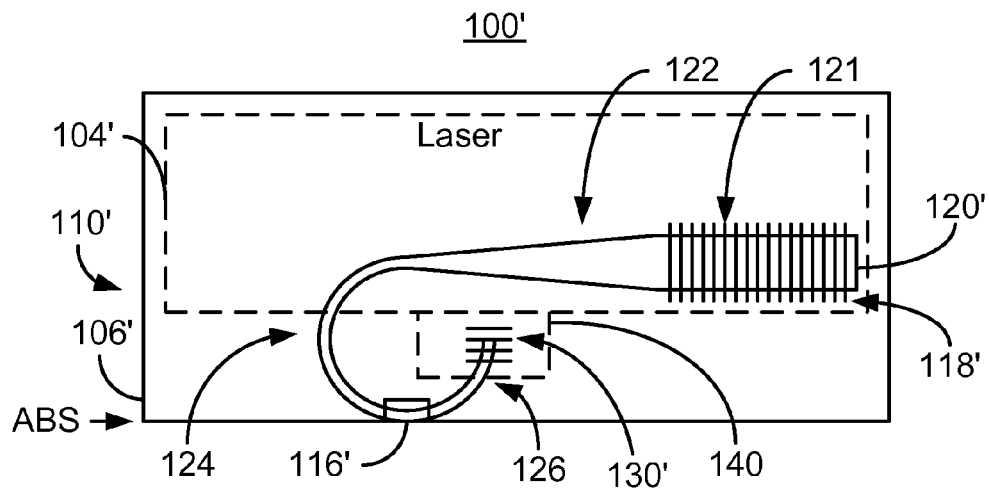
FIG. 3 depicts an exemplary embodiment of a portion of an EAMR disk drive.

FIG. 3 depicts an exemplary embodiment of a portion of an EAMR disk drive 100'. In some embodiments the view shown is a trailing face view. For clarity, FIG. 3 is not to scale. For simplicity not all portions of the EAMR disk drive 100' are shown. In addition, although the disk drive 100' is depicted in the context of particular components other and/or different components may be used. Further, the arrangement of components may vary in different embodiments. The EAMR disk drive 100' is analogous to the EAMR disk drive 100 depicted in FIG. 2. Thus, the EAMR transducer 110' shown in FIG. 3 may be used in the EAMR disk drive 100 shown in FIG. 2. The EAMR disk drive 100' thus includes media (not shown), a slider 106', and an EAMR transducer 110'. In the trailing face view, the laser diode 104' is shown by a dashed line. For clarity, the pole, coil(s), any read head, and other components are not shown in FIG. 3. The EAMR transducer 110', as well as the slider 106', has an ABS configured to reside in proximity to the media during use of the transducer 110'. Although described as coupled to the slider 106', the EAMR transducer 110' may be considered to be fabricated as part of the slider 106'.

The EAMR transducer 110' includes an NFT 116', an input grating 118', waveguide 120', and output device 130'. Also shown in FIG. 3 is optional energy detector 140 that may be optically coupled to the output device 130'. The input grating 118' is optically coupled with the laser 104'. Thus, light from the laser 104' is coupled into the input 121 of the waveguide 120'. The waveguide 120' includes a tapered portion 122 and bending portions 124 and 126. The tapered portion 122 allows the input optical energy to be more intense over a smaller region. The bending portions 124 and 126 redirect the optical energy along the waveguide 120'. Although shown as having substantially the same radius of curvature, the bending portions 124 and 126 may have different radii of curvature. Further, straight portions may also be incorporated into the bending portions 124 and/or 126. Thus, the optical energy redirected by the waveguide 120' need not follow a path that continuously curves. The bending portion 124 directs the optical energy toward the ABS. The optical energy is also provided to the NFT 116'. The NFT 116' may output a portion of the energy from the waveguide 120' to the media. The waveguide 120' also extends past the NFT 116'. The bending portion 126 extends to the output device 130'. In the embodiment shown, the output device 130' is an output grating at which the waveguide 120' ends. Thus, the output device 130' couples out a portion of the energy not coupled to the media. The photodetector 140 may be used to monitor the power output by the output device 130' and, therefore, the laser 104.

Because the energy from the laser 104' is output by the output device 130', the energy from the laser 104' may be monitored. Monitoring the output power from the output device 130' may aid in actively aligning the laser 104' with the slider 106'. More specifically, the laser 104' and slider 106' may be actively aligned. The laser 104' may be energized and the output power of the output device 140 monitored. When the output power passes a threshold and/or reaches a maximum, the laser 104' is aligned as desired. This alignment may be accomplished on an individual laser or laser bar level. Thus, alignment between the laser 104' and slider 106' may be improved. In some embodiments, the output power from the output device 130' may be monitored during operation of the EAMR transducer 110'. Based on fluctuations in the output power, the power to the laser 104' may be adjusted. For example, if the output power of the output device 130' is reduced, the power to the laser 104' may be increased. Thus, variations in the environment, degradation of the output of the laser 104' due to age, and other factors may be accounted for. In addition, the output power from the output device 140 may be monitored during testing of the EAMR disk drive 100' to test performance of the device. Further, the waveguide 120' first couples light into the NFT 116'. The power incident upon the NFT 116' may thus be determined. Thus, fabrication and operation of the EAMR transducer 110' may be facilitated.

Figure 4:
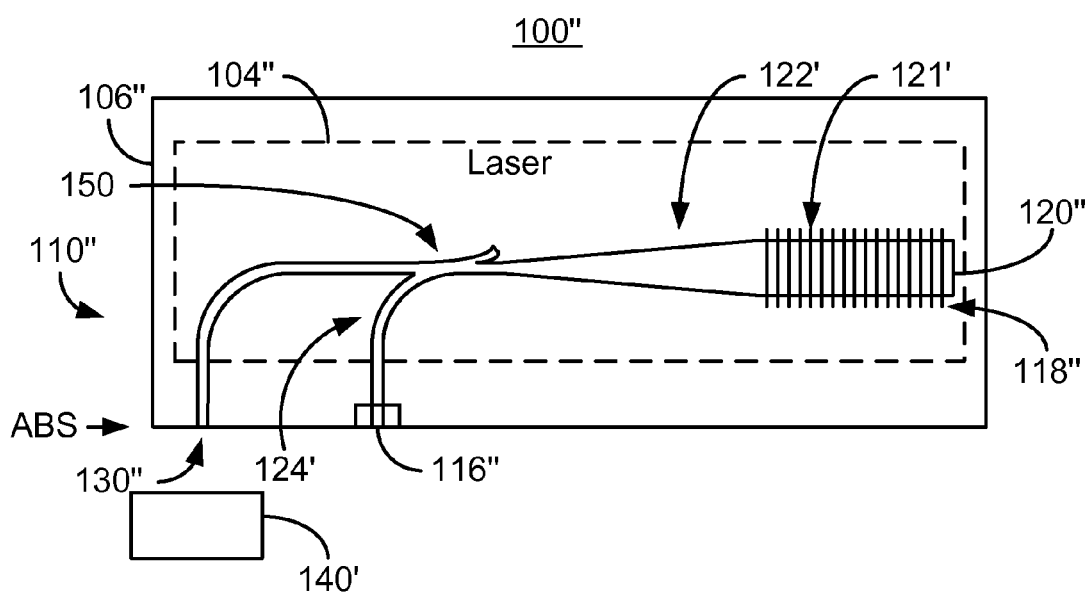
FIG. 4 depicts another exemplary embodiment of a portion of an EAMR disk drive.

FIG. 4 depicts an exemplary embodiment of a portion of an EAMR disk drive 100". In some embodiments the view shown is a trailing face view. For clarity, FIG. 4 is not to scale. For simplicity not all portions of the EAMR disk drive 100" are shown. In addition, although the disk drive 100" is depicted in the context of particular components other and/or different components may be used. Further, the arrangement of components may vary in different embodiments. The EAMR disk drive 100" is analogous to the EAMR disk drive 100 depicted in FIG. 2. Thus, the EAMR transducer 110" shown in FIG. 4 may be used in the EAMR disk drive 100 shown in FIG. 2. The EAMR disk drive 100" thus includes media (not shown), a slider 106", and an EAMR transducer 110". In the trailing face view, the laser diode 104" is shown by a dashed line. For clarity, the pole, coil(s), any read head, and other components are not shown in FIG. 4. The EAMR transducer 110", as well as the slider 106", has an ABS configured to reside in proximity to the media during use of the transducer 110". Although described as coupled to the slider 106", the EAMR transducer 110" may be considered to be fabricated as part of the slider 106".

The EAMR transducer 110" includes an NFT 116", an input grating 118", waveguide 120", and output device 130". Also shown in FIG. 4 is optional energy detector 140' that may be optically coupled to the output device 130". The input grating 118" is optically coupled with the laser 104". Thus, light from the laser 104" is coupled into the input 121' of the waveguide 120". The waveguide 120" includes a tapered portion 122' and bending portion 124'. The tapered portion 122' allows the input optical energy to be more intense over a smaller region. The bending portion 124' redirects the optical energy toward the ABS, where the waveguide 120" terminates. Thus, the optical energy is provided to the NFT 116". The NFT 116" may output a portion of the energy from the waveguide 120" to the media.

The EAMR transducer 110" also includes an optical coupler 150. The optical coupler 150 is configured to couple a small portion of the energy out of the waveguide 120" and to the output device 130". In various embodiments, not more than five to ten percent of the energy is coupled out of the waveguide 120". For example, in some embodiments, the coupler 150 is a 20 dB coupler that couples substantially five percent of the energy out of the waveguide 120" to the output device 130". In the embodiment shown, an optional energy detector 140" is also shown. Using the energy detector 140'", the power output by the output device 130" may be monitored.

Because the energy from the laser 104" is output by the output device 130", the energy from the laser 104" may be monitored. Thus, the benefits discussed above may be achieved. For example, monitoring the output power from the output device 130" may aid in manufacturing the EAMR disk drive 100" and in operation of the EAMR disk drive 100". More specifically, alignment and integration of the laser 104" with the slider 106" may be improved through active alignment. This active alignment may be performed at the individual laser or laser bar level. The EAMR disk drive 100" may also be tested during the fabrication process. Further, the output power of the laser 104" can be monitored and controlled during operation to provide more stable performance. Thus, fabrication and operation of the EAMR transducer 110" may be facilitated.

Figure 5:
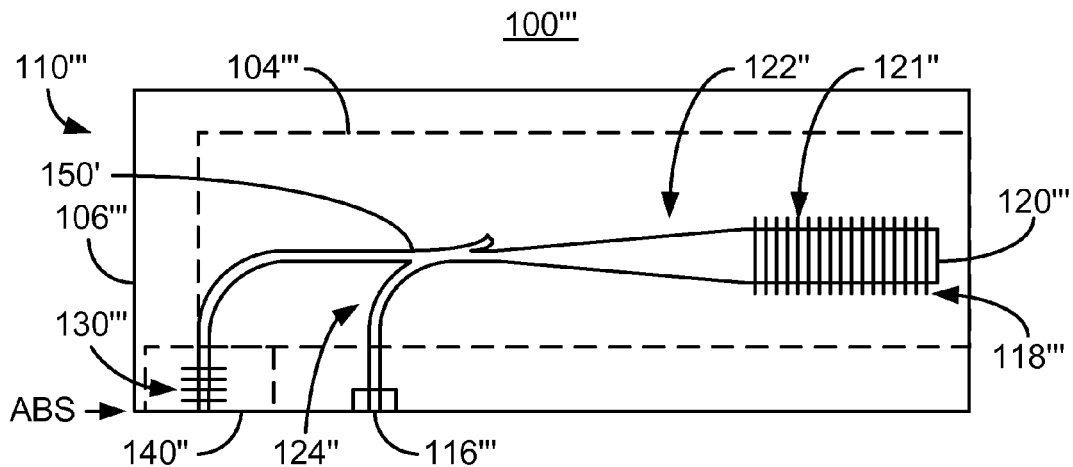
FIG. 5 depicts another exemplary embodiment of a portion of an EAMR disk drive.

FIG. 5 depicts an exemplary embodiment of a portion of an EAMR disk drive 100'". In some embodiments the view shown is a trailing face view. For clarity, FIG. 5 is not to scale. For simplicity not all portions of the EAMR disk drive 100'" are shown. In addition, although the disk drive 100'" is depicted in the context of particular components other and/or different components may be used. Further, the arrangement of components may vary in different embodiments. The EAMR disk drive 100'" is analogous to the EAMR disk drives 100 and 100" depicted in FIGS. 2 and 4. Thus, the EAMR transducer 110'" shown in FIG. 5 may be used in the EAMR disk drive 100 shown in FIG. 2. The EAMR disk drive 100'" thus includes media (not shown), a slider 106'", and an EAMR transducer 110'". In the trailing face view, the laser diode 104'" is shown by a dashed line. For clarity, the pole, coil(s), any read head, and other components are not shown in FIG. 5. The EAMR transducer 110'", as well as the slider 106'", has an ABS configured to reside in proximity to the media during use of the transducer 110'". Although described as coupled to the slider 106'", the EAMR transducer 110'" may be considered to be fabricated as part of the slider 106'".

The EAMR transducer 110'" includes an NFT 116'", an input grating 118'", waveguide 120'", and output device 130'". Also shown in FIG. 5 is optional energy detector 140" that may be optically coupled to the output device 130". The components 104'", 106'", 110'", 116'", 118'", 120'", 121", 122", 124", 130'", 140", and 150' are analogous to the components 104", 106", 110", 116", 118", 120", 121', 122', 124', 130", 140', and 150, respectively. However, the output device 130'" differs from the output device 130" of FIG. 4. More specifically, the output device 130" depicted in FIG. 4 is simply an output of the waveguide 110'". However, the output device 130'" is an output grating. In the embodiment shown, an optional energy detector 140'" is also shown. Using the energy detector 140", the power output by the output device 130'" may be monitored.

Because the energy from the laser 104'" is output by the output grating 130'", the energy from the laser 104'" may be monitored. Thus, the benefits discussed above may be achieved. For example, improved fabrication and testing as well as improved performance may be achieved.

Figure 6:
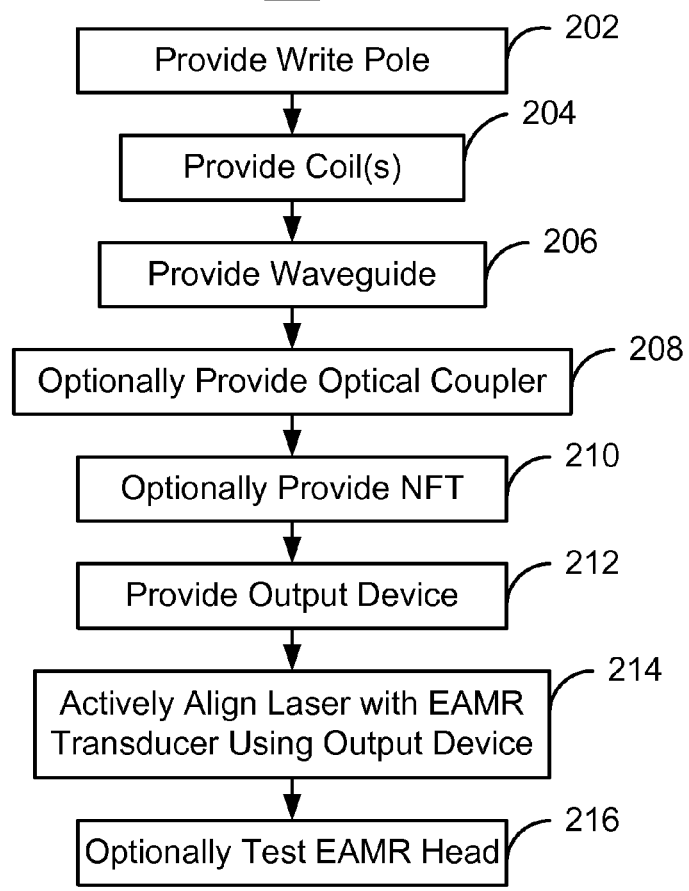
FIG. 6 depicts an exemplary embodiment of a method of forming a portion of an EAMR disk drive.

FIG. 6 depicts an exemplary embodiment of a method 200 of forming a portion of an EAMR disk drive. For simplicity, some steps may be omitted, combined, performed in parallel, performed in another sequence, and/or interleaved. The method 200 is described in the context of the EAMR disk drive 100'. However, the method 200 may be used to fabricate other EAMR disk drives such as the disk drives 100, 100", and 100'". In addition, the method 200 is described in the context of fabricating a single disk drive 100'. However, multiple transducers, sliders, and multiple disk drives may be fabricated substantially in parallel.

The write pole and coil(s) for the disk drive is provided, via steps 202 and 204, respectively. In some embodiments, step 202 includes deposition and patterning of various layers to form the structures of the EAMR transducer 110' on the slider 106'. In addition, other structures such as the grating 118' are formed. The waveguide 120' is formed, via step 206. Step 206 may include forming input portion, bending portions, tapered portion, and any other portions in the desired location and having the desired configuration.

The optical coupler 150/150' may optionally be provided, via step 210. Step 210 may thus be performed if the EAMR transducer 100" and/or 110'" is being fabricated. The NFT 116' may also be optionally fabricated, via step 210. The output device 130' is also fabricated, via step 212. Step 212 may thus include forming the structures for an output grating or other feature.

The laser 104' is actively aligned with the EAMR transducer 110', via step 214. Step 214 may include performing an initial, rough passive alignment followed by an active alignment. More specifically, the laser 104' is energized while the power output by output device 130' is monitored. For example, photodetector 140' might be used in step 214 to monitor the power output at the output device 230'. The laser 104' is moved relative to the slider 106' until the output power detected exceeds a threshold and/or is maximized. The laser 104' and slider 106' are then affixed to each other. In addition, the EAMR disk drive 100' is optionally tested, via step 216. Step 216 may include energizing the laser 104' and monitoring the output of the output device 130'.

Thus, the EAMR disk drive 100' may be formed. EAMR disk drives 100, 100", and 100'" may be fabricated and tested.

Figure 7:
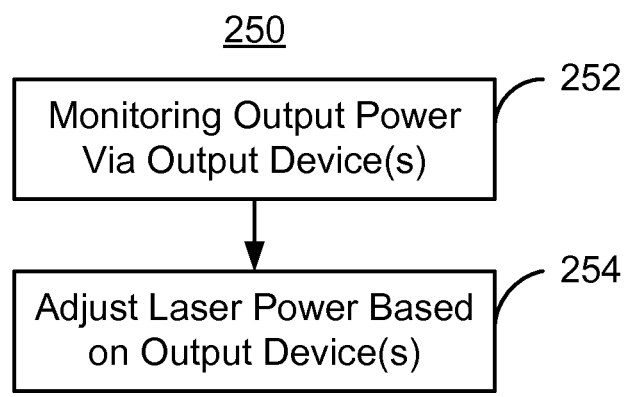
FIG. 7 depicts an exemplary embodiment of a method of using an EAMR disk drive.

FIG. 7 depicts an exemplary embodiment of a method 250 for using an EAMR disk drive. For simplicity, some steps may be omitted, combined, performed in parallel, performed in another sequence, and/or interleaved. The method 250 is described in the context of the EAMR disk drive 100'. However, the method 250 may be used to fabricate other EAMR disk drives such as the disk drives 100, 100", and 100'".

The output power from the output device 130' is monitored, via step 252. Step 252 may include monitoring the energy/photo detector 140' during operation of the EAMR disk drive 100. Based on the output power, the power provided to the laser 104' may be adjusted, via step 254. For example, the output power measured in step 252 may drop due to environmental factors or aging of the EAMR transducer 110'. If a constant laser power is desired, then the power input to the laser 104' is increased. Alternatively, if the output power measured in step 252 increases, then the power input to the laser 104' may be dropped. Thus, using the method 250, the lasers 104, 104', 104", and 104'" may be controlled. Thus, performance of the EAMR disk drive 100 may be improved.

We claim:

1. An energy assisted magnetic recording (EAMR) transducer coupled with a laser and having an air-bearing surface (ABS) configured to reside in proximity to a media during use, the EAMR transducer comprising:
a write pole configured to write to a region of the media;
at least one coil for energizing the write pole;
a waveguide having an input optically coupled to the laser and configured to direct energy from the laser toward the ABS for heating the region of the media, the waveguide terminating at an end;
a near field transducer (NFT) proximate to the ABS and optically coupled to the waveguide; and
an output device optically coupled to the waveguide, the output device coupling out a portion of the energy not coupled to the media and not coupled to the NFT, the NFT residing between the input and the end, and wherein the NFT further resides along the waveguide between the output device and the input of the waveguide such that the waveguide extends past the NFT and directs the portion of the energy toward the NFT and then from the NFT to the output device.

2. The EAMR transducer of claim 1 wherein the output device further includes:
an output grating.

3. The EAMR transducer of claim 2 wherein the waveguide includes a bending portion, the NFT and the output grating residing at the bending portion.

4. The EAMR transducer of claim 3 wherein the bending portion has a first radius of curvature to the NFT and a second radius of curvature between the NFT and the output grating.

5. An energy assisted magnetic recording (EAMR) transducer coupled with a laser and having an air-bearing surface (ABS) configured to reside in proximity to a media during use, the EAMR transducer comprising:
a write pole configured to write to a region of the media;
at least one coil for energizing the write pole;
a waveguide having an input optically coupled to the laser and configured to direct energy from the laser toward the ABS for heating the region of the media, the waveguide terminating at an end;
a near field transducer (NFT) proximate to the ABS and optically coupled to the waveguide; and
an output device optically coupled to the waveguide, the output device coupling out a portion of the energy not coupled to the media and not coupled to the NFT, the NFT residing between the input and the end, and wherein the NFT further resides along the waveguide between the output device and the input of the waveguide such that the waveguide directs the portion of the energy toward the NFT and then from the NFT to the output device;
wherein
wherein the waveguide includes a bending portion, the NFT and the output grating residing at the bending portion, the bending portion having a first radius of curvature to the NFT and a second radius of curvature between the NFT and the output grating, and wherein the first radius of curvature is substantially equal to the second radius of curvature.

6. The EAMR transducer of claim 1 further comprising:
an energy detector coupled with the output device.

7. The EAMR transducer of claim 1 further comprising:
an input grating optically coupled with the laser and for coupling the energy from the laser to the input of the waveguide.

8. An energy assisted magnetic recording (EAMR) disk drive comprising:
a media for storing data;
a slider having a back side, a trailing face, and an air-bearing surface (ABS) opposite to the back side;
at least one laser coupled with the slider;
at least one EAMR transducer coupled with the slider, at least a portion of the at least one EAMR transducer residing in proximity to the ABS, the at least one EAMR transducer further including at least one waveguide, at least one near-field transducer NFT, at least one output device, at least one pole, and at least one coil, the at least one waveguide for directing energy from the at least one laser toward the ABS, the at least one NFT optically coupled with the at least one waveguide and for heating a region of a recording media, the output device coupling out at least a portion of the energy not coupled into the NFT by the waveguide;
wherein the waveguide terminates at an end, wherein the NFT resides between the input and the end, and wherein the NFT further resides along the waveguide between the output device and the input of the waveguide such that the waveguide extends past the NFT and directs the portion of the energy toward the NFT and then from the NFT to the output device.

9. The EAMR disk drive of claim 8 wherein the at least one output device includes an output grating.

10. A method for providing an energy assisted magnetic recording (EAMR) transducer coupled with a laser for providing energy and having an air-bearing surface (ABS) configured to reside in proximity to a media during use, the method comprising:
providing a write pole configured to write to a region of the media;
providing at least one coil for energizing the write pole;
providing at least one waveguide having an input optically coupled to the laser and configured to direct energy from the laser toward the ABS for heating the region of the media, the waveguide terminating at an end;
providing a near field transducer (NFT) proximate to the ABS and optically coupled to the waveguide; and
providing an output device optically coupled to the waveguide, the output device coupling out at least a portion of the energy not coupled to the media and not coupled to the NFT, the NFT residing between the input and the end, and wherein the NFT further resides along the waveguide between the output device and the input of the waveguide such that the waveguide extends past the NFT and directs the portion of the energy toward the NFT and then from the NFT to the output device.

11. The method of claim 10 wherein the output device further includes an output grating, wherein the NFT resides between the input and the end.

12. The method of claim 10 further comprising:
actively aligning the laser with the EAMR transducer using the output device.

* * * * *

UNITED STATES PATENT AND TRADEMARK OFFICE
CERTIFICATE OF CORRECTION

| | | |
|---|---|---|
| PATENT NO. | : 8,670,295 B1 | Page 1 of 1 |
| APPLICATION NO. | : 12/973328 | |
| DATED | : March 11, 2014 | |
| INVENTOR(S) | : Yufeng Hu, Ruolin Li and Ut Tran | |

It is certified that error appears in the above-identified patent and that said Letters Patent is hereby corrected as shown below:

In the Claims col. 7, line 56 (Claim 5, line 22) "wherein" should be deleted

Signed and Sealed this
Third Day of June, 2014

Michelle K. Lee
*Deputy Director of the United States Patent and Trademark Office*